США012122386B2

United States Patent
Saleem et al.

(10) Patent No.: US 12,122,386 B2
(45) Date of Patent: Oct. 22, 2024

(54) DYNAMIC ADJUSTMENT OF DRIVER-SPECIFIC VEHICLE PERFORMANCE LIMITS

(71) Applicant: GM GLOBAL TECHNOLOGY OPERATIONS LLC, Detroit, MI (US)

(72) Inventors: Shuhaib Saleem, Detroit, MI (US); Benjamin Tran, Royal Oak, MI (US); Zaid Shaheri, Dearborn Heights, MI (US); Russell A. Patenaude, Macomb Township, MI (US); Ahmed F. Al Alawy, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 270 days.

(21) Appl. No.: 17/903,435

(22) Filed: Sep. 6, 2022

(65) Prior Publication Data
US 2024/0075935 A1 Mar. 7, 2024

(51) Int. Cl.
*B60W 30/182* (2020.01)
*B60N 2/02* (2006.01)
*B60R 21/01* (2006.01)

(52) U.S. Cl.
CPC ......... *B60W 30/182* (2013.01); *B60N 2/0244* (2013.01); *B60R 21/01* (2013.01); *B60R 2021/01265* (2013.01); *B60W 2540/049* (2020.02); *B60W 2540/30* (2013.01); *B60W 2552/05* (2020.02); *B60W 2710/30* (2013.01); *B60W 2720/10* (2013.01)

(58) Field of Classification Search
CPC ............ B60W 50/085; B60W 30/182; B60W 2540/049; B60W 2552/05; G07C 5/0808; B60N 2/0244; B60R 2021/01265
See application file for complete search history.

(56) References Cited

U.S. PATENT DOCUMENTS

| 2018/0335783 A1* | 11/2018 | Sweeney ........... B60W 60/0053 |
| 2021/0261150 A1* | 8/2021 | Kruse ............. G08G 1/096775 |
| 2024/0157935 A1* | 5/2024 | Esna Ashari Esfahani ................ B60W 30/0956 |

FOREIGN PATENT DOCUMENTS

EP 3031686 A1 * 6/2016 ............ B60W 30/00

* cited by examiner

*Primary Examiner* — George C Jin
(74) *Attorney, Agent, or Firm* — Quinn IP Law

(57) ABSTRACT

A method for controlling a motor vehicle having an electronic control unit (ECU), includes enabling an initial set of vehicle performance limits of the motor vehicle via the ECU in response to a request signal from a computer device. The method includes detecting a current vehicle state of the motor vehicle, including one or more of a location of the motor vehicle, an occupancy state of the motor vehicle, and/or an experience level of a driver thereof, and dynamically adjusting at least one of the performance limits in response to the current vehicle state. A motor vehicle includes one or more road wheels and vehicle components connected to a vehicle body. The ECU includes non-transitory memory on which is recorded instructions for performing the method.

20 Claims, 2 Drawing Sheets

DYNAMIC ADJUSTMENT OF DRIVER-SPECIFIC VEHICLE PERFORMANCE LIMITS

INTRODUCTION

Motor vehicles include a myriad of different hardware and software components, including various sensors, onboard controllers, and associated control routines. Such equipment collectively enables the performance of propulsion, braking, steering, suspension, infotainment, passenger comfort, and other functions in response to operator-generated and/or autonomously-generated input commands.

Aboard some vehicles, a control system may be operable for selectively limiting or disabling certain performance features in response to user-selectable threshold limits. For instance, emerging "smart driver" web-based or software applications ("apps") allow a user to set static limits on a particular system or component operating state, e.g., a maximum vehicle speed, as a condition for vehicle operation. However, existing software-based approaches for implementing such threshold limits aboard a motor vehicle remain suboptimal when applied to regulating driving behavior under actual operating conditions, particularly when applied to new or inexperienced drivers.

SUMMARY

The concepts described in detail herein relate to computer-based systems and related methodologies for implementing dynamically-adjustable performance limits aboard a motor vehicle. The performance limits may be initially set by a user to regulate driving and other in-vehicle behavior, e.g., the user's own behavior or that of a household member, for instance a teenager or another newly-licensed or otherwise inexperienced driver ("protected driver"). Unlike approaches that apply static limits as noted above, the present approach instead accounts for actual operating conditions such as a global positioning system (GPS)-based driving location, road type/local speed limit including whether the motor vehicle is presently "off road", time of day, prevailing weather conditions, current traffic levels, vehicle occupancy status, driver age, and other possible conditions.

In response to changes in such conditions, an onboard controller or electric control unit (ECU) dynamically adjusts one or more of the initial performance limits as needed, for instance by lowering a permissible operating speed of the motor vehicle below the initial threshold limit set by the user, or temporarily disabling one or more of the user's threshold limits in response to certain real-time conditions as described below. The present solutions leverage onboard vehicular telematic communication functions and cloud-based computer connectivity to properly account for the actual/real-world operating conditions encountered by the protected driver in the course of a given drive cycle.

According to an exemplary embodiment, a method for controlling a motor vehicle having an ECU includes enabling a set of initial performance limits of the motor vehicle via the ECU in response to a request signal from a computer device, e.g., a smart phone. The method in this embodiment includes detecting a current vehicle state. As used herein, "current vehicle state" refers to the present physical state (e.g., location, occupancy status, occupant age/driving experience level, etc.) and/or a dynamic state (e.g., ground speed, trajectory, etc.) of the motor vehicle. The method further includes dynamically adjusting at least one of the performance limits via the ECU, i.e., in real-time during a drive cycle of the motor vehicle, in response to the current vehicle state.

The motor vehicle may include a seat belt mechanism, with the current vehicle state in such an embodiment possibly including the location of the motor vehicle coinciding with an off-road location. In such an embodiment, dynamically adjusting the vehicle performance limit(s) may include temporarily disabling a latching requirement of the seat belt mechanism when the location of the motor vehicle coincides with the off-road location.

Dynamically adjusting the vehicle performance limit(s) could also include automatically limiting a ground speed of the motor vehicle, e.g., based on a GPS-based location or a machine vision-detected location as the current vehicle state.

The method may optionally include determining a local speed limit, in which case automatically limiting the ground speed of the motor vehicle may entail limiting the ground speed to the local speed limit.

The motor vehicle may include a radio. The method may therefore include automatically limiting a volume setting of the radio.

An aspect of the disclosure includes the motor vehicle having a window, in which case the method may include determining an open/closed state of the window. Automatically limiting the volume setting of the radio may occur based on the open/closed state of the window, possibly in conjunction with the location of the motor vehicle. For instance, automatically limiting the volume setting of the radio may include reducing a maximum volume of the radio when the open/closed state of the window is an open state and the location coincides with a residential area or a school zone.

Another aspect of the disclosure includes the motor vehicle having an occupancy sensor and a WiFi system. The method in such an embodiment may include determining whether a driver of the motor vehicle is a sole occupant of the motor vehicle using data from the occupancy sensor, and then temporarily disabling the WiFi system when the driver is the sole occupant, with this condition being the above-noted occupancy state Detecting the current vehicle state in one or more embodiments includes detecting an emergency vehicle and/or an in-vehicle emergency condition. In such an implementation, dynamically adjusting the performance limit(s) may include temporarily disabling one or more of the performance limits in response to the emergency vehicle and/or the in-vehicle emergency condition.

The motor vehicle in accordance with a possible construction includes a multi-position power-adjustable driver seat. Dynamically adjusting the vehicle performance limit(s) in such an embodiment may include limiting a degree of reclination of the adjustable driver seat, e.g., based on a PRNDL setting and/or based on the experience level of a driver of the motor vehicle.

A motor vehicle is also disclosed herein. An embodiment of the motor vehicle includes road wheels and vehicle components connected to a vehicle body. The motor vehicle also includes an ECU including a processor, a vehicle telematic unit (VTU), and non-transitory memory on which is recorded instructions. Execution of the instructions by the processor causes the processor to perform the above-summarized method or embodiments thereof as set forth herein.

The method according to yet another implementation includes enabling an initial set of vehicle performance limits of the motor vehicle via the ECU in response to a request signal from a computer device. The method also includes determining a current vehicle state of the motor vehicle, including determining a location using a GPS receiver, and then dynamically adjusting at least one of the vehicle performance limits via the ECU in response to the current vehicle state. This particular implementation of the method includes automatically limiting a ground speed of the motor vehicle to a local speed limit based on the location, and automatically limiting a volume setting of the radio based on the location and an open/closed state of a window of the motor vehicle.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

The appended drawings are not necessarily to scale, and may present a simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged to form a variety of different configurations. Thus, the following detailed description is not intended to limit the scope of the disclosure as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

Figure 1:
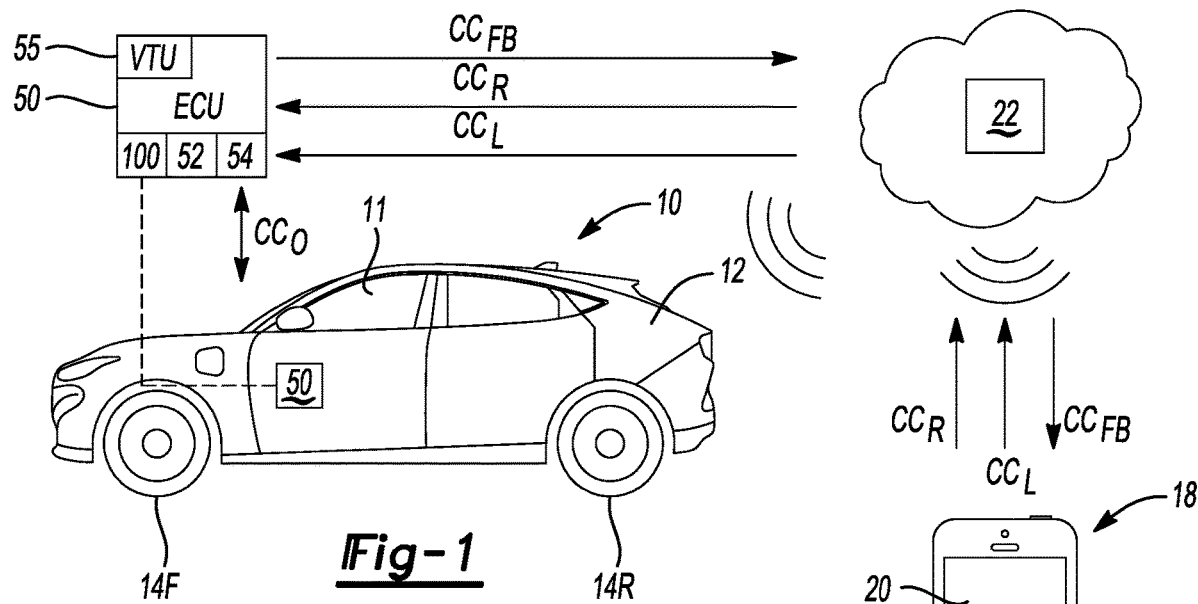
FIG. 1 schematically illustrates a system for applying dynamically-adjustable performance limits aboard a motor vehicle in accordance with the disclosure.

FIG. 1 illustrates a vehicle 10 having windows 11, a vehicle body 12, respective front and rear road wheels 14F and 14R connected to the vehicle body 12, and an electronic control unit (ECU) 50. As used herein, the term "vehicle" may encompass various mobile platforms such as but not limited to passenger, commercial, industrial, tracked, recreational, and off-road and/or all-terrain vehicles (ATVs), motorcycles, farm equipment, watercraft, aircraft, etc., without limitation. However, for illustrative consistency the vehicle 10 of FIG. 1 will be described hereinafter in the representative context of a motor vehicle, with the vehicle 10 referred as the motor vehicle 10 below.

Within the scope of the disclosure, operating performance of the motor vehicle 10 of FIG. 1 is selectively governed, in response to a request signal (arrow $CC_R$) from a computer device 18, by a set of dynamically-adjustable vehicle performance limits (arrow $CC_L$). In a typical usage scenario, a parent or guardian of an inexperienced driver, e.g., a newly-licensed teenage driver, may access a web site or software application ("app") 16 via the computer device 18, such as smartphone as shown or a desktop, laptop, or tablet computer, in order to initially set the vehicle performance limits (arrow $CC_L$) as initial limits. For instance, a user may access the app 16 by touching a display screen 20 of the computer device 18 to generate the above-noted request signal (arrow $CC_R$), or the request signal (arrow $CC_R$) may be transmitted concurrently with a transmission of the vehicle performance limits (arrow $CC_L$). The user then selects appropriate corresponding values according to the user's discretion, with exemplary values including vehicle ground speed, acceleration rate, location, local speed limit, time of day, maximum radio volume, seatbelt interlock state, a driver's experience level, a seat reclining position or permitted degree of reclination, etc., as described in detail below with particular reference to FIG. 3.

The initial vehicle performance limits (arrow $CC_L$) are communicated to the ECU 50, e.g., via a cloud-based server 22 and operation of a vehicle telematics unit (VTU) 55 of the ECU 50. For illustrative simplicity the VTU 55 is shown in FIG. 1 as being part of the ECU 50, but is likewise implementable as a separate device as appreciated in the art. The vehicle performance limits (arrow $CC_L$) are enforced in real-time aboard the motor vehicle 10 by operation of the ECU 50, with feedback data (arrow $CC_{FB}$) possibly being communicated back to the computer device 18 via the VTU 55 and the cloud-based server 22 in some embodiments, e.g., as a confirming report of a present location, speed, or other state of the motor vehicle 10.

Unlike static limits, the vehicle performance limits (arrow $CC_L$) contemplated herein are initially set by the user as noted above and thereafter dynamically adjusted as needed by the ECU 50 as conditions are encountered during a given drive cycle. That is, dynamic adjustment occurs automatically in response to actual "real-world" operating conditions, such as when entering a residential area, school zone, or other low-speed driving zone, when traveling on ice-covered or wet pavement, or when driving at night. To this end, the ECU 50 executes computer-readable instructions embodying a method 100, an exemplary embodiment of which is described below with reference to FIG. 3.

The term "ECU" and related terms such as controller, microcontroller, control unit, or similar terms refer to one or various combinations of Application Specific Integrated Circuit(s) (ASIC), Field-Programmable Gate Array (FPGA), electronic circuit(s), central processing unit(s), e.g., microprocessor(s) and associated transitory and non-transitory memory/storage component(s). The ECU 50 of FIG. 1 is depicted schematically as having a processor 52 of one or more of such types, as well as memory 54 inclusive of non-transitory memory or tangible storage devices (read only, programmable read only, solid-state, random access, optical, magnetic, etc.).

The memory 54, on which computer-readable instructions embodying the method 100 may be recorded, is capable of storing machine-readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Ultimately, the ECU 50 outputs a control signal (arrow $CC_O$) to one or more vehicle components and systems (CS) 24 (see FIG. 2) to regulate behavior thereof in conformance with the vehicle performance limits (arrow $CC_L$), as situationally adjusted by the ECU 50.

The VTU 55 of FIG. 1 as appreciated in the art provides wireless communication and is capable of extra-vehicle communications, including communicating with a communication network system having wireless and wired communication capabilities. The VTU 55 is capable of extra-vehicle communications that includes short-range ad hoc vehicle-to-vehicle (V2V) communication and/or vehicle-to-everything (V2x) communication, which may include communication with an infrastructure monitor, e.g., a traffic camera and ad hoc vehicle communication. Alternatively, or in addition, the VTU 55 may include a wireless telematics communication system capable of short-range wireless communication to the computer device 18.

In one or more embodiments, the computer device 18 shown in FIG. 1 may be programmed with the app 16 or provided with remote access thereto, with the app 16 including a wireless protocol to communicate with the VTU 55 to identify the motor vehicle 10 and an associated protected driver, e.g., a teenager or other driver with an age-restricted license. The computer device 18 may then execute the extra-vehicle communication, including communicating with the cloud-based server 22 via a communication network, e.g., one or more satellites, antennas, and/or communication nodes (not shown). Alternatively or in addition, the VTU 55 may execute the extra-vehicle communication directly by communicating with the cloud-based server 22.

Figure 2:
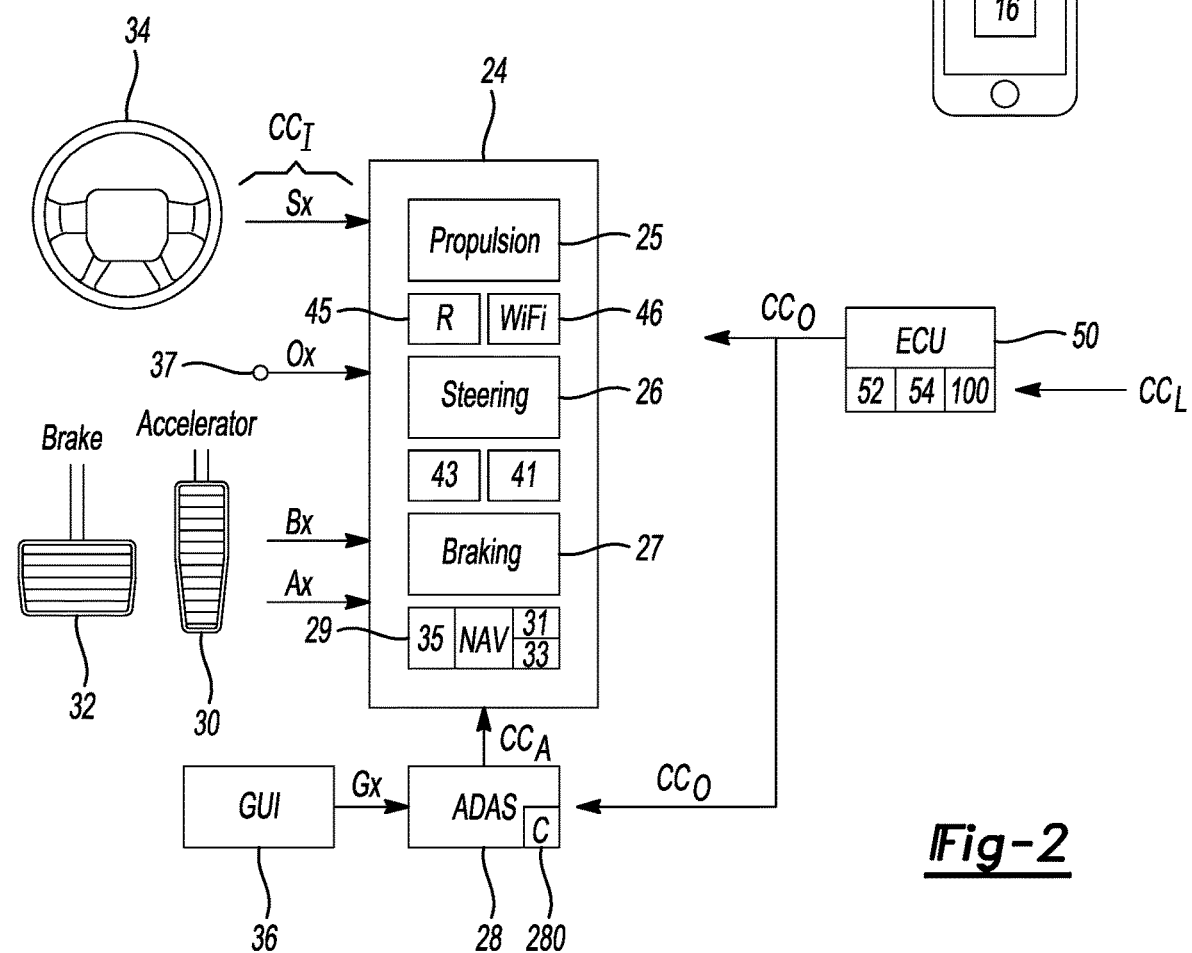
FIG. 2 is a schematic illustration of a set of vehicle systems and components and an electronic control unit (ECU) programmed to implement a method as set forth herein.

Referring to FIG. 2, the motor vehicle 10 shown in FIG. 1 includes the plurality of systems and components 24 (hereinafter "components 24" for simplicity), each of which is operable for performing one or more corresponding functions. The components 24 include at least a propulsion system ("Propulsion") 25, a steering system ("Steering") 26, and a braking system ("Braking") 27 respectively configured to transfer tractive torque, braking (deceleration) forces, and steering forces to one or more of the front and rear road wheels 14F and 14R of the motor vehicle 10 of FIG. 1. In some embodiments, the components 24 may also include an Advanced Driver Assistance System (ADAS) 28. The various components 24 respond to input commands (arrow $CC_I$) such as operator inputs to an accelerator pedal 30 (arrow Ax), a brake pedal 32 (arrow Bx), and a steering wheel 34 (arrow Sx), and/or an autonomous commands (arrow $CC_A$) autonomously generated by the ADAS 28 to the same ends, and possibly an occupancy signal (arrow Ox) from an occupancy sensor 37. The ADAS 28 may be controlled via inputs (arrow Gx) from a graphical user interface device (GUI) 36 located within an interior of the motor vehicle 10 of FIG. 1.

The propulsion system 25 in particular has a maximum torque or speed output that is limited in the course of execution of the method 100 by enforcement of the vehicle performance limits (arrow $CC_L$). The propulsion system 25 as contemplated herein may be configured as an internal combustion engine coupled to a step-gear transmission or continuously variable transmission that are controlled by a powertrain controller to generate tractive power in response to operator requests and input commands. Alternatively, the propulsion system 25 may be configured as a hybrid electric powertrain system wherein the tractive power is generated by either or both an internal combustion engine and one or multiple electric machines that are controlled by a powertrain controller, e.g., the ECU 50 or another device, to generate tractive power. In still other configurations, the propulsion system 25 may be configured as an electric powertrain system in which tractive power is generated by one or more rotary electric machines.

The steering system 26 for its part may include the steering wheel 34 and a steering actuator (not shown). The steering system 26 is typically configured to control steering in the front road wheels 14F shown in FIG. 1. However, in other embodiments the steering system 26 may be configured to control steering in the front road wheels 14F and/or the rear road wheels 14R. The braking system 27 in turn may include wheel speed sensors and brakes (not shown) to provide mechanical braking to the road wheels 14F, 14R of FIG. 1. When the motor vehicle 10 is configured as a hybrid electric vehicle or an electric vehicle, the mechanical braking effort provided by the braking system 27 may be supplemented by regenerative braking via generation of reactive torque through the electric machine(s) noted above, as appreciated in the art.

The components 24 may also include a navigation system (NAV) 29 that employs information from an onboard GPS receiver 31 and possibly an Inertial Measurement Unit (IMU) 33. In an embodiment, the GPS receiver 31 is configured as a global navigation satellite system (GNSS) sensor. The IMU 33 as appreciated in the art is an electronic device that employs one or more of a combination of accelerometers, gyroscopes, and/or magnetometers to measure and report specific force, angular rate, yaw, and orientation of the motor vehicle 10. The ECU 50 thus monitors these and other values when determining how and when to adjust the initial vehicle performance limits (arrow $CC_L$) during performance of the present method 100. Other components 24 that may be envisioned within the scope of the disclosure include in-vehicle components, such as but not limited to an adjustable driver seat (DS) 41 and a seatbelt mechanism (SB) 43 as appreciated in the art, as well as a radio (R) 45 and a WiFi system 46.

Still referring to FIG. 2, the ADAS 28 is arranged to provide operator assistance features by controlling one of the components 24 in conjunction with or without direct interaction of a vehicle operator. To this end, the ADAS 28 may include an electronic control unit (C) 280 and one or more subsystems (not shown) that collectively provide operator assistance features, including one or more of a fully autonomous driving system, an adaptive cruise control system, a lane-keeping control system, a lane change control system, an autonomous braking/collision avoidance system, and/or other systems that are configured to command and control autonomous vehicle operation separate from or in conjunction with operator requests. The ADAS 28 within the scope of the disclosure may interact with and access information from an onboard map database (M) 35 for route planning and to control operation of the motor vehicle 10 via the lane-keeping system, the lane-centering system, and/or other systems that are configured to command and control autonomous vehicle operation.

Figure 3:
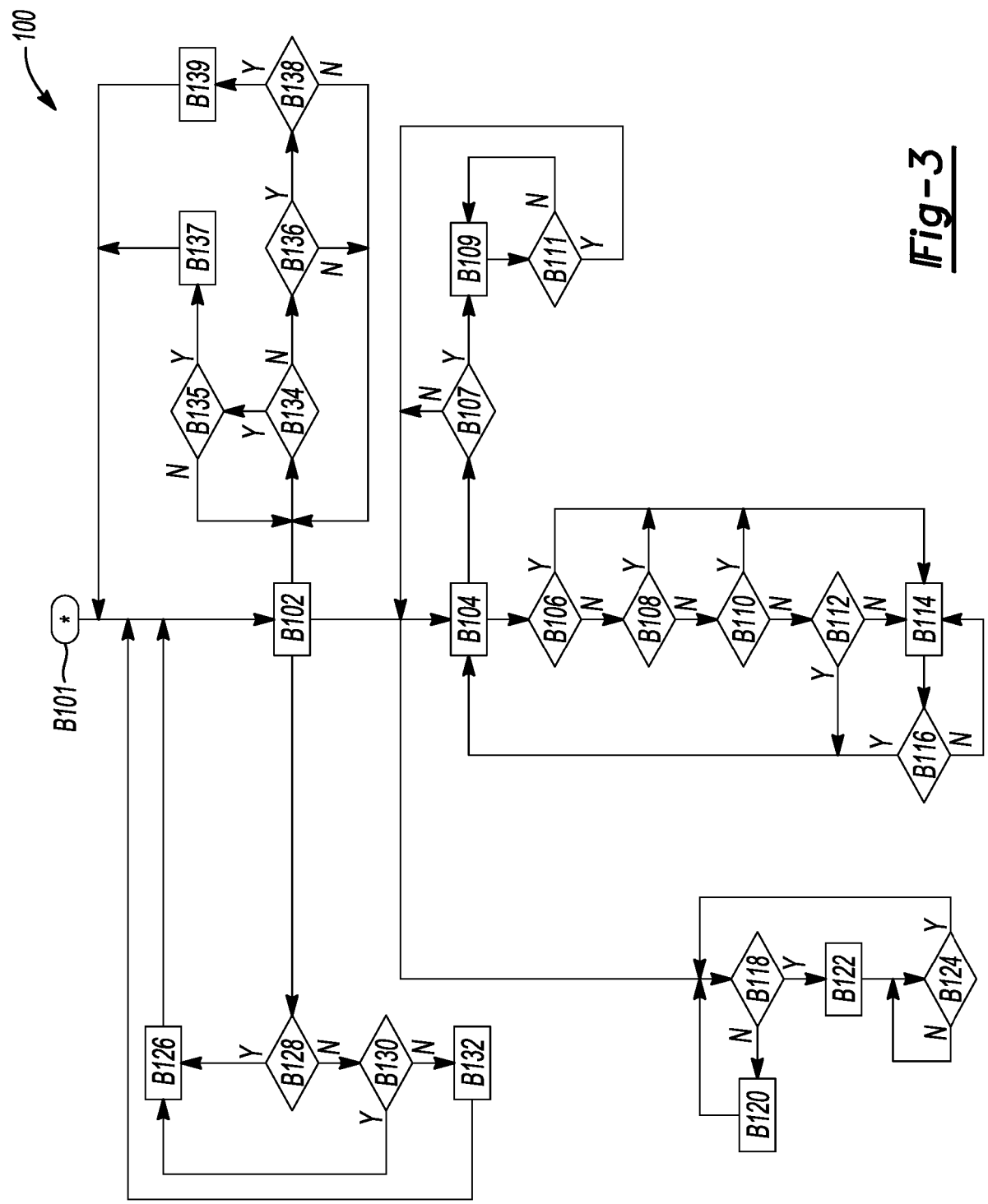
FIG. 3 is a flow chart illustrating a possible embodiment of a method for dynamically adjusting initial performance limits via the ECU of FIGS. 1 and 2 in accordance with an aspect of the disclosure.

Referring now to FIG. 3, the method 100 in accordance with the present disclosure is executed by the processor 52 of FIG. 1 from non-transitory elements of the memory 54, e.g., ROM, to enforce and, as needed, to adjust the initial vehicle performance limits (arrow $CC_L$) communicated from the computer device 18. Performance of the method 100 deviates from enforcement of traditional static threshold limits by considering factors such as where the motor vehicle 10 is currently being driven, e.g., in lower-speed residential areas or school zones, on surface streets, or on higher-speed highways. The processor 52 then considers factors such as the presence of emergency vehicles and/or an in-vehicle emergency condition, weather conditions, time of day, occupancy of the motor vehicle 10, age/experience of the driver, etc. As detailed below, the present teachings could be used to dynamically adjust one or more of the vehicle performance limits (arrow $C_L$) in some embodiments by enforcing a local speed limit in lieu of a maximum speed limit, with such a maximum speed limit initially specified in the vehicle performance limits (arrow $C_L$) communicated to the ECU 50, or a maximum volume setting of the radio 45 of FIG. 2, an available status of the WiFi system 46, an interlock state of the seat belt mechanism 43, a degree of declination or reclining position of the adjustable driver seat 41, etc.

The method 100 in its various embodiments enables control of the motor vehicle 10 or other vehicles equipped with the ECU 50, and includes enabling initial vehicle performance limits (arrow $CC_L$) of the motor vehicle 10 via the ECU 50 in response to the request signal (arrow $CC_R$) from the computer device 18 of FIG. 1. The method 100 in general includes determining a current vehicle state of the motor vehicle 10, e.g., a dynamic state, a physical state or location, occupancy status, driver age, experience, or other status, and/or a present setting of one of more of the components 24 of the motor vehicle 10. The current vehicle state includes a location of the motor vehicle 10, an occupancy state of the motor vehicle 10, and/or an experience level of a driver of the motor vehicle 10 in the various embodiments described herein. The method 100 also includes dynamically adjusting at least one of the initial vehicle performance limits (arrow $CC_L$) via the ECU 50 in response to the current vehicle state.

In an exemplary embodiment, and beginning with block B101 ("*"), with "block" as used herein being a particular logic sequence or code step within the scope of the method 100, the ECU 50 of FIGS. 1 and 2 initializes in response to a user's expressed desire to apply and enforce threshold limits on performance of the motor vehicle 10. For example, a parent of a teenager or another inexperienced driver could open the app 16 shown in FIG. 1 and request enforcement of an initial set of the vehicle performance limits (arrow $CC_L$), with the ECU 50 being alerted via a predetermined bit code or other enabling request signal (arrow $CC_R$) that the method 100 will be enabled and performed. An owner or manager of a fleet of rental, school, or corporate vehicles could initiate the method 100 in a similar manner. Likewise, a given user could choose to enforce performance limits on their own driving behavior, such that the user and the protected driver could be the same entity. The method 100 proceeds to block B102 once the method 100 has initialized.

Block B102 entails receiving the initial vehicle performance limits (arrow $CC_L$) via the computer device 18 of FIG. 1. In response, the computer device 18 communicates a suitable enabling signal to the ECU 50 via the cloud-based server 22. In a possible embodiment, the user may be presented via the display screen 20 of FIG. 1 with a list of selectable performance parameters to which the user could apply a corresponding threshold limit. For instance, block B102 could include enabling a "buckle to drive" function or latching requirement that requires the seat belt mechanism 43 (FIG. 2) to be latched as a condition for enabling the propulsion system 25, or enabling dynamic speed throttling, seat reclining limits of the adjustable driver seat 41, geofencing limits for an area of operation of the motor vehicle 10, conditions for permitting WiFi communication aboard the motor vehicle 10, volume level control of the radio 45, etc. The method 100 then proceeds to block B104.

At block B104, the ECU 50 of FIGS. 1 and 2 applies the initial vehicle performance limits (arrow $CC_L$ of FIGS. 1 and 2) received from the computer device 18. As applied in block B104, the vehicle performance limits (arrow $CC_L$) may act as default values to be selectively adjusted as needed as operating conditions change or evolve. That is, the vehicle performance limits (arrow $CC_L$) as actually applied may vary during a drive cycle, or the ECU 50 may temporarily disable enforcement of the vehicle performance limits (arrow $CC_L$) as circumstances dictate. The method 100 then proceeds to blocks B106 and B107.

Block B106 of FIG. 3 includes detecting the presence of an emergency condition as at least part of the current vehicle state. For example, through V2V or V2X communication, the VTU 55 of FIG. 1 could be alerted to the precise location and velocity of the emergency vehicle, with the ECU 50 determining whether a driver of the motor vehicle 10 will be required to stop or exit the current roadway to allow the emergency vehicle to pass. The method 100 proceeds to block B114 when the ECU 50 detects the emergency condition, and to block B108 in the alternative when the ECU 50 does not detect the emergency condition.

B107 includes determining if Adaptive Cruise Control (ACC) or self-driving modes of operation of the motor vehicle 10 are presently enabled as part of the current vehicle state. The method 100 proceeds to block B109 when such functions are enabled, and to block B118 when not enabled.

At block B108, the ECU 50 may determine, as at least part of the current driving state, if the driver or other passenger of the motor vehicle 10 of FIG. 1 has pressed an emergency response button to indicate an in-vehicle emergency, e.g., has initiated an "SOS" call. The method 100 proceeds to block B114 under such a condition, and to block B110 in the absence of such a condition.

At block B109, the ECU 50 via the ADAS 28 of FIG. 2 may apply dynamic speed throttling thresholds to the ACC function. That is, the ECU 50 may command the ADAS 28 to maintain the present speed of the motor vehicle 10 in accordance with the vehicle performance limits (arrow $CC_L$), which in turn are dynamically adjusted as needed in real-time based on the various factors described herein. The method 100 then proceeds to block B111.

Block B110 of FIG. 3 includes determining if the motor vehicle 10 is no longer traveling on a mapped road, i.e., has entered an "off-road" location. Such information also describes the current vehicle state, and could be determined by comparing a present location of the motor vehicle to corresponding coordinates of a navigation map, for instance, or using a camera and vision software aboard the motor vehicle 10 is so equipped. The method 100 proceeds to block B114 if the motor vehicle 10 has entered an off-road location. The method 100 otherwise proceeds to block B112 when the motor vehicle 10 remains on a mapped road, e.g., on a road surface that is mapped by or available in the mapping database 35 of FIG. 2.

At block B111, the ECU 50 of FIGS. 1 and 2 next determines if ACC functionality has been disabled within the ADAS 28, e.g., via two-way communication between the ECU 50 and the ADAS 28 or the controller 280 thereof. If so, the method 100 proceeds to blocks B104 and B118. The method 100 proceeds to block B109 in the alternative when ACC functionality has not been disabled.

At block B112, the ECU 50 may determine as part of the current vehicle state whether current traffic conditions, weather conditions, construction, and/or road closures may require routing of the motor vehicle 10 outside of a geofenced area, with such an area possibly applied by the user upon initialization of the method 100. Block B112 may entail processing the various information via the navigation system 29 of FIG. 2 and/or received by the ECU 50 via the VTU 55. The method 100 proceeds to block B114 when re-routing of the motor vehicle 10 is warranted, with the method 100 otherwise proceeding to block B104.

Block B114 may include temporarily disabling applied vehicle performance limits (arrow $CC_L$), e.g., a seatbelt latching requirement, and possibly sending an SMS text alert or email message to the user, e.g., via the feedback signals (arrow $CC_{FB}$) of FIG. 2. The method 100 thereafter proceeds to block B116.

Block B116 of FIG. 3 includes determining if the emergency condition detected at block B106 or B108 has ended. The method 100 proceeds to block B104 in this instance, and repeats block B114 in the alternative when the emergency condition remains active.

At block B118, the ECU 50 shown in FIGS. 1 and 2 determines if a GPS-based or other local speed limit has been successfully determined. As appreciated in the art, the motor vehicle 10 via its VTU 55 and the navigation system 29 shown in FIG. 2 may be apprised in real-time of the local speed limit on a given roadway on which the motor vehicle 10 is presently traveling. Such information is typically available via GPS and mapping data as part of onboard navigation functions, as appreciated in the art, possibly augmented by machine vision, e.g., an onboard camera (not shown) detecting and deciphering a posted speed limit sign. Block B118 may therefore entail verifying via the ECU 50 whether information regarding such a local speed limit is available, or the motor vehicle 10 in some embodiments may detect the posted speed limit, e.g., using a vision system or camera (not shown). The method 100 proceeds to block B122 when the local speed limit is available. The method otherwise proceeds to block B120.

Block B120 includes disabling speed throttling functions of the ACC, as enforced by the ADAS 28 depicted in FIG. 2. The method 100 then returns to block B118.

Block B122 may include throttling the maximum speed limit to match the GPS-based or otherwise determined local speed limit. That is, regardless of an actual requested speed of a driver of the ECU 50, the ECU 50 via the propulsion system 25 and the ADAS 28 of FIG. 2 may throttle the speed to match the posted local speed. One may compare the effects of block B122 to those of typical static limits. In a representative static limit scenario, a user could restrict the propulsion system 25 to a maximum speed of 70 miles per hour (MPH) for a protected driver, e.g., via the app 16 of FIG. 1. In such a case, while the ECU 50 would not permit the motor vehicle 10 to exceed 70 MPH, it is also true that the motor vehicle 10 could exceed a posted/GPS-based local speed limit when such a limit is less than 70 MPH. Block B122 thus allows for dynamic adjustment of the vehicle performance limits (arrow $CC_L$), in this case by lowering the permissible speed to the local speed limit or a reasonable range thereof, e.g., within about 5%. The method 100 proceeds to block B124 when the speed of the motor vehicle 10 matches the posted/GPS-based speed limit.

At block B126 of FIG. 3, the ECU 50 next determines if a park, reverse, neutral, drive, low (PRNDL) setting of the motor vehicle 10 is currently set to park (P), with park being at least part of the current vehicle state within the scope of the disclosure. The method 100 proceeds to block B128 when the motor vehicle 10 is in park, with the method 100 otherwise proceeding to block B130.

At block B128, the ECU 50 next enables WiFi functionality of the WiFi system 46 (FIG. 2) aboard the motor vehicle 10. The method 100 then repeats block B102.

At block B130, the ECU 50 determines if at least one passenger other than the driver is currently present within a passenger compartment of the motor vehicle 10, i.e., that the driver is not the sole occupant. For this action, block B130 may entail using the occupancy sensor 37 of FIG. 2, e.g., a seat-based weight sensor or an infrared sensor, to determine the occupancy status as or as part of the current vehicle state. Block B130 may also verify the current angle of reclination of the seat 41. When the passenger occupancy status is TRUE, i.e., when at least one additional passenger (two or more occupants) is present, the method 100 proceeds to block B128. The method 100 otherwise proceeds to block B132.

Block B132 may include optionally disabling WiFi functionality within the motor vehicle 10 via the ECU 50 of FIGS. 1 and 2 in response to the current vehicle state, in this case including occupancy of the motor vehicle 10. A benefit of block B132 is that a driver, sitting alone in the motor vehicle 10, is not permitted to browse the internet or otherwise engage in WiFi-based activities. As part of block B132, the fact that the motor vehicle 10 is not in park, i.e., its transmission (not shown) is in gear, may be cause for restricting reclination of the driver seat 41 as another possible control action. The method 100 then returns to block B102.

Block B134 of the method 100 includes determining if GPS coordinates of the motor vehicle 10 of FIG. 1 or other data indicative of a location thereof correspond to a residential area, a school zone, a construction zone, or another low-speed area. If so, the method 100 proceeds to block B135. The method 100 otherwise proceeds to block B136.

At block B135, the ECU 50 may determine whether one or more windows 11 of the motor vehicle 10 of FIG. 1 are open, e.g., to at least a predetermined opening level such as 10% or more. The method 100 proceeds to block B137 when one or more windows 11 are open as the current vehicle state, or to block B134 when the windows 11 remain closed.

Block B136 entails determining, via the ECU 50, whether the present ground speed of the motor vehicle 10 is above a low threshold speed, e.g., 35 MPH. The method 100 proceeds to block B138 when this is the case, and to block B134 in the alternative.

Block B138, which is analogous to block B135, entails determining whether one or more windows 11 of the motor vehicle 10 of FIG. 1 are open. The method 100 proceeds to block B139 when one or more windows 11 are open, and to block B134 when the windows 11 remain closed.

At block B137, with the motor vehicle 10 traveling above the speed of block B136 and not presently in a residential area, school zone, or other predetermined "low-noise" area of operation, the ECU 50 may increase a maximum radio volume threshold up to thresholds of the vehicle performance limits (arrow $CC_L$) of FIGS. 1 and 2. The method 100 then returns to block B102.

Block B139 may entail automatically decreasing a volume of the radio 45 within the motor vehicle 10, via the ECU 50, to below a level of the initial vehicle performance limits (arrow $CC_L$) of FIGS. 1 and 2, i.e., as initially set by the user. That is, block B139 effectively lowers the vehicle performance limits (arrow $CC_L$) corresponding to permissible radio volumes. The method 100 then returns to block B102.

Block B124 of FIG. 3 next determines if there has been a change in the posted/GPS-based street speed limit. The method 100 proceeds to block B118 when the speed limit has changed, and otherwise proceeds to block B124.

As will be appreciated by those skilled in the art in view of the foregoing disclosure, the method 100 of FIG. 3 or portions thereof may be implemented in software of the ECU 50 to ensure that performance limits initially set by a user of the app 16 of FIG. 1 or a similar website are dynamically adjusted in real-time based on actual operating conditions. Control may be implemented via the ADAS 28 of FIG. 2 in some instances as disclosed above, or via direct control from an associated control processor of the various affected vehicle subsystems. Thus, when a protected driver is traveling in a residential area, in the presence of emergency vehicles, in inclement weather, off road, etc., the ECU 50 is able to dynamically adapt the vehicle performance limits (arrow $CC_L$) as initially set by the user via the app 16 of FIG. 1 so that driver or vehicle behavior is better suited to the actual environment. These and other attendant benefits will be appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for controlling a motor vehicle, comprising:
   enabling a set of vehicle performance limits of the motor vehicle via an electronic control unit (ECU) in response to a request signal from a computer device;
   determining a current vehicle state of the motor vehicle via the ECU, wherein the current vehicle state includes a location of the motor vehicle, an occupancy state of the motor vehicle, and an experience level of a driver of the motor vehicle; and
   dynamically adjusting at least one of the vehicle performance limits via the ECU in response to the current vehicle state.

2. The method of claim 1, wherein the motor vehicle includes a seat belt mechanism, and dynamically adjusting the at least one of the vehicle performance limits includes temporarily disabling a latching requirement of the seat belt mechanism when the location of the motor vehicle coincides with an off-road location.

3. The method of claim 1, wherein dynamically adjusting the at least one of the vehicle performance limits includes automatically limiting a ground speed of the motor vehicle based on the location of the motor vehicle.

4. The method of claim 1, wherein the motor vehicle includes a radio, and wherein dynamically adjusting the at least one of the vehicle performance limits includes automatically limiting a volume setting of the radio.

5. The method of claim 4, wherein the motor vehicle includes a window, the method further comprising:
   determining an open/closed state of the window, wherein automatically limiting the volume setting of the radio occurs based on the open/closed state of the window or the location of the motor vehicle.

6. The method of claim 5, wherein automatically limiting the volume setting of the radio includes reducing a maximum volume of the radio when the open/closed state of the window is an open state and the location coincides with a residential area or a school zone.

7. The method of claim 1, wherein the motor vehicle includes an occupancy sensor and a WiFi system, and wherein the current vehicle state includes the occupancy status of the motor vehicle, the method further comprising:
   determining using the occupancy sensor whether a driver of the motor vehicle is a sole occupant of the motor vehicle; and
   temporarily disabling the WiFi system when the occupancy status is indicative of the driver of the motor vehicle being the sole occupant.

8. The method of claim 1, further comprising:
   detecting an emergency vehicle and/or an in-vehicle emergency condition, wherein dynamically adjusting the at least one of the performance limits includes temporarily disabling one or more of the vehicle performance limits in response to the emergency vehicle and/or the in-vehicle emergency condition.

9. The method of claim 1, wherein:
   the motor vehicle includes an adjustable driver seat; and
   dynamically adjusting the at least one of the vehicle performance limits includes limiting a degree of reclination of the adjustable driver seat based on the experience level of the driver.

10. A motor vehicle comprising:
    a vehicle body;
    a set of road wheels connected to the vehicle body;
    a set of vehicle components connected to the vehicle body, the vehicle components including at least a propulsion system; and
    an electronic control unit (ECU) including a processor, a vehicle telematic unit (VTU), and non-transitory memory on which is recorded instructions, wherein execution of the instructions by the processor causes the processor to:
      receive a request signal from a computer device enabling an initial set of vehicle performance limits of the motor vehicle;
      determine a current vehicle state of the motor vehicle, the current state of the motor vehicle including a location of the motor vehicle, an occupancy state of the motor vehicle, and an experience level of a driver of the motor vehicle; and
      dynamically adjust at least one of the vehicle performance limits in response to the current vehicle state.

11. The motor vehicle of claim 10, wherein the set of vehicle components includes a seat belt mechanism and the current vehicle state includes the location of the motor vehicle coinciding with an off-road location, and wherein the execution of the instructions by the processor causes the processor to:
    dynamically adjust the at least one of the vehicle performance limits by temporarily disabling a latching requirement of the seat belt mechanism when the location of the motor vehicle coincides with the off-road location.

12. The motor vehicle of claim 11, wherein the execution of the instructions by the processor causes the processor to:
dynamically adjust the at least one of the vehicle performance limits by automatically limiting a ground speed of the motor vehicle based on the location.

13. The motor vehicle of claim 12, wherein the execution of the instructions by the processor causes the processor to:
determine a local speed limit using the location of the motor vehicle; and
automatically limit the ground speed to the local speed limit when the local speed limit is less than the maximum speed limit.

14. The motor vehicle of claim 10, wherein the set of vehicle components includes a radio, and wherein the execution of the instructions by the processor causes the processor to:
dynamically adjust the at least one of the vehicle performance limits by automatically limiting a volume setting of the radio based on the location.

15. The motor vehicle of claim 14, wherein the set of vehicle components includes a window, and wherein the execution of the instructions by the processor causes the processor to:
determine an open/closed state of the window; and
automatically limit the volume setting of the radio based on the open/closed state of the window and the location of the motor vehicle.

16. The motor vehicle of claim 15, wherein the execution of the instructions by the processor causes the processor to:
automatically limit the volume setting of the radio by reducing a maximum volume setting of the radio when the open/closed state of the window is an open state and the location of the motor vehicle coincides with a residential area or a school zone.

17. The method of claim 10, wherein the motor vehicle includes an occupancy sensor and the set of vehicle components includes WiFi system, and wherein the execution of the instructions by the processor causes the processor to:
determine whether a driver of the motor vehicle is a sole occupant of the motor vehicle using the occupancy sensor; and
temporarily disable the WiFi system when the driver of the motor vehicle is the sole occupant of the motor vehicle.

18. The motor vehicle of claim 10, wherein the execution of the instructions by the processor causes the processor to:
determine the current vehicle state by detecting an emergency vehicle or an in-vehicle emergency condition; and
dynamically adjust the at least one of the vehicle performance limits by temporarily disabling the vehicle performance limits in response to the emergency vehicle or the in-vehicle emergency condition.

19. A method for controlling a motor vehicle, comprising:
enabling an initial set of vehicle performance limits of the motor vehicle via an electronic control unit (ECU) of the motor vehicle in response to a request signal from a computer device, the vehicle performance limits including a maximum speed limit of the motor vehicle;
detecting a current vehicle state of the motor vehicle, including determining a location of the motor vehicle using a GPS receiver; and
dynamically adjusting at least one of the vehicle performance limits via the ECU in response to the current vehicle state, including:
automatically limiting a speed of the motor vehicle to a local speed limit based on the location; and
automatically limiting a volume setting of a radio of the motor vehicle based on the location and an open/closed state of a window of the motor vehicle.

20. The method of claim 5, wherein automatically limiting the volume setting of the radio occurs based on the open/closed state of the window and the location of the motor vehicle.

* * * * *